US011141864B2

(12) United States Patent
Ooba

(10) Patent No.: US 11,141,864 B2
(45) Date of Patent: Oct. 12, 2021

(54) DETECTION SYSTEM

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 229 days.

(21) Appl. No.: 16/508,959

(22) Filed: Jul. 11, 2019

(65) Prior Publication Data

US 2020/0070351 A1    Mar. 5, 2020

(30) Foreign Application Priority Data

Aug. 31, 2018 (JP) .............................. JP2018-163757

(51) Int. Cl.
*B25J 9/16* (2006.01)
*G05B 19/406* (2006.01)
(Continued)

(52) U.S. Cl.
CPC ........... *B25J 9/1697* (2013.01); *B25J 9/1661* (2013.01); *G05B 19/406* (2013.01); *B25J 9/0093* (2013.01);
(Continued)

(58) Field of Classification Search
CPC ...... B25J 9/1697; B25J 9/1661; B25J 9/1602; B25J 9/0093; B25J 9/0084; G05B 19/406;
(Continued)

(56) References Cited

U.S. PATENT DOCUMENTS

2005/0075752 A1* 4/2005 Ban .................... G05B 19/4182
700/213
2005/0075798 A1 4/2005 Edwards et al.
(Continued)

FOREIGN PATENT DOCUMENTS

GB 2492257 A 12/2012
JP H05196444 A 8/1993
(Continued)

OTHER PUBLICATIONS

Japanese Office Action dated Jan. 19, 2021, in connection with corresponding JP Application No. 2018-163757 (8 pp., including machine-generated English translation).
(Continued)

*Primary Examiner* — Khoi H Tran
*Assistant Examiner* — Tanner L Cullen
(74) *Attorney, Agent, or Firm* — Maier & Maier, PLLC

(57) ABSTRACT

A detection system includes a first detection apparatus that detects an object that is being moved, within a predetermined detection region, a number of times, a work-data creation device that creates, every time the first detection apparatus detects the object, work data having a first data element that indicates at least a position of the object obtained by the first detection apparatus and a second data element that includes at least an index related to the object and obtained at the time of the detection, and a work-data storage unit that stores the work data created by the work-data creation means. The work-data storage unit selects, as the work data that should be stored, one of the work data that is newly created for the object and the work data for the object that has been stored by the work-data storage unit, on the basis of the index.

6 Claims, 3 Drawing Sheets

(51) Int. Cl.
  *G05B 19/418* (2006.01)
  *B25J 9/00* (2006.01)
(52) U.S. Cl.
  CPC .............. *G05B 19/4182* (2013.01); *G05B 2219/31081* (2013.01)
(58) Field of Classification Search
  CPC ........... G05B 2219/31081; G05B 2219/40577; G05B 19/4182; G05B 2219/39102; G05B 2219/40554; G05B 2219/37555; B65G 2203/0225; B65G 2203/0233; G06T 1/0014
  See application file for complete search history.

(56) References Cited

U.S. PATENT DOCUMENTS

| | | |
|---|---|---|
| 2005/0261864 A1 | 11/2005 | Edwards et al. |
| 2011/0082586 A1 | 4/2011 | Nishihara |
| 2012/0236140 A1* | 9/2012 | Hazeyama .............. B25J 9/1697 348/94 |
| 2016/0151916 A1 | 6/2016 | Kanno et al. |
| 2017/0261968 A1* | 9/2017 | Kobayashi ............. H05K 13/00 |
| 2018/0272535 A1* | 9/2018 | Ogawa ................... B25J 19/023 |
| 2018/0314867 A1* | 11/2018 | Kotula ............... G06K 7/10722 |
| 2019/0071261 A1* | 3/2019 | Wertenberger ....... B25J 15/0052 |
| 2019/0270200 A1* | 9/2019 | Sakai ....................... B25J 9/163 |
| 2021/0233228 A1* | 7/2021 | Yamaguchi ........... G06T 1/0014 |

FOREIGN PATENT DOCUMENTS

| | | | |
|---|---|---|---|
| JP | 2002113679 A | 4/2002 | |
| JP | 2002283257 A | * 10/2002 | ................ B25J 9/16 |
| JP | 2004354320 A | 12/2004 | |
| JP | 2009014357 A | 1/2009 | |
| JP | 2009-291895 A | 12/2009 | |
| JP | 2015232482 A | 12/2015 | |
| JP | 2016107349 A | 6/2016 | |
| JP | 2016-209995 A | 12/2016 | |

OTHER PUBLICATIONS

Japanese Search Report dated Dec. 22, 2020, in connection with corresponding JP Application No. 2018-163757 (20 pp., including machine-generated English translation).

* cited by examiner

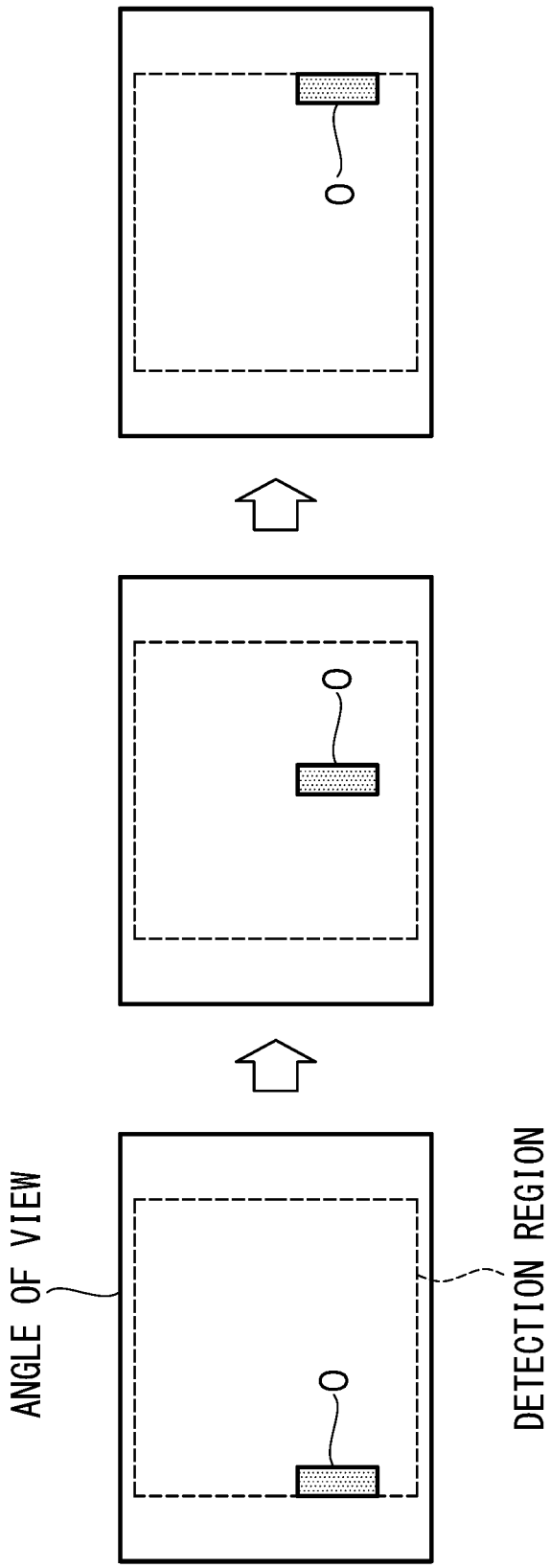

DETECTION SYSTEM

CROSS-REFERENCE TO RELATED APPLICATIONS

This application is based on and claims priority to Japanese Patent Application No. 2018-163757 filed on Aug. 31, 2018, the content of which is incorporated herein by reference in its entirety.

FIELD

The present invention relates to a detection system.

BACKGROUND

In the related art, there is a known robot system that is provided with: a detection unit that detects an object that is being conveyed by a conveyor device; and a robot, and in which the robot picks the object on the conveyor device by using a tool mounted on a distal end section thereof (for example, see Japanese Unexamined Patent Application, Publication No. 2016-209995). In this robot system, when an image of the same object is acquired twice or more by an image acquisition device, detection results that are obtained at the second and subsequent times are invalidated.

SUMMARY

According to a first aspect, the present invention provides a detection system including: a detection unit that detects an object, which is being moved by a moving means, within a detection region a plurality of times; a work-data creation unit that creates, every time the detection unit performs detection of the object, work data having a first data element that indicates at least a position of the object obtained by the detection unit and a second data element that includes at least an index which is related to the object and which is obtained at the time of the detection; and a work-data storage unit that stores the work data created by the work-data creation unit, wherein the work-data storage unit selects, as work data that should be stored, one of the work data that is newly created for the object and the work data for the object that has been stored by the work-data storage unit, on the basis of the index.

According to a second aspect, the present invention provides a detection system including: a detection unit that detects an object, which is being moved by a moving means, within a detection region a plurality of times; a work-data creation unit that creates, every time the detection unit performs detection of the object, work data having a first data element that indicates at least a position of the object obtained by the detection unit and a second data element that includes at least an index which is related to the object and which is obtained at the time of the detection; and a work-data storage unit that stores the work data created by the work-data creation unit, wherein the work-data storage unit selects, as a data element to be stored, one of a data element in the work data that is newly created for the object and the data element in the work data for the object that has been stored by the work-data storage unit, on the basis of the index, and the data element is one of the first data element and the second data element.

BRIEF DESCRIPTION OF DRAWINGS

FIG. 3 is a view for explaining movement of an object to be detected by the detection system according to the first embodiment.

DETAILED DESCRIPTION

A detection system according to a first embodiment of the present invention will be described below with reference to the drawings.

Figure 1:
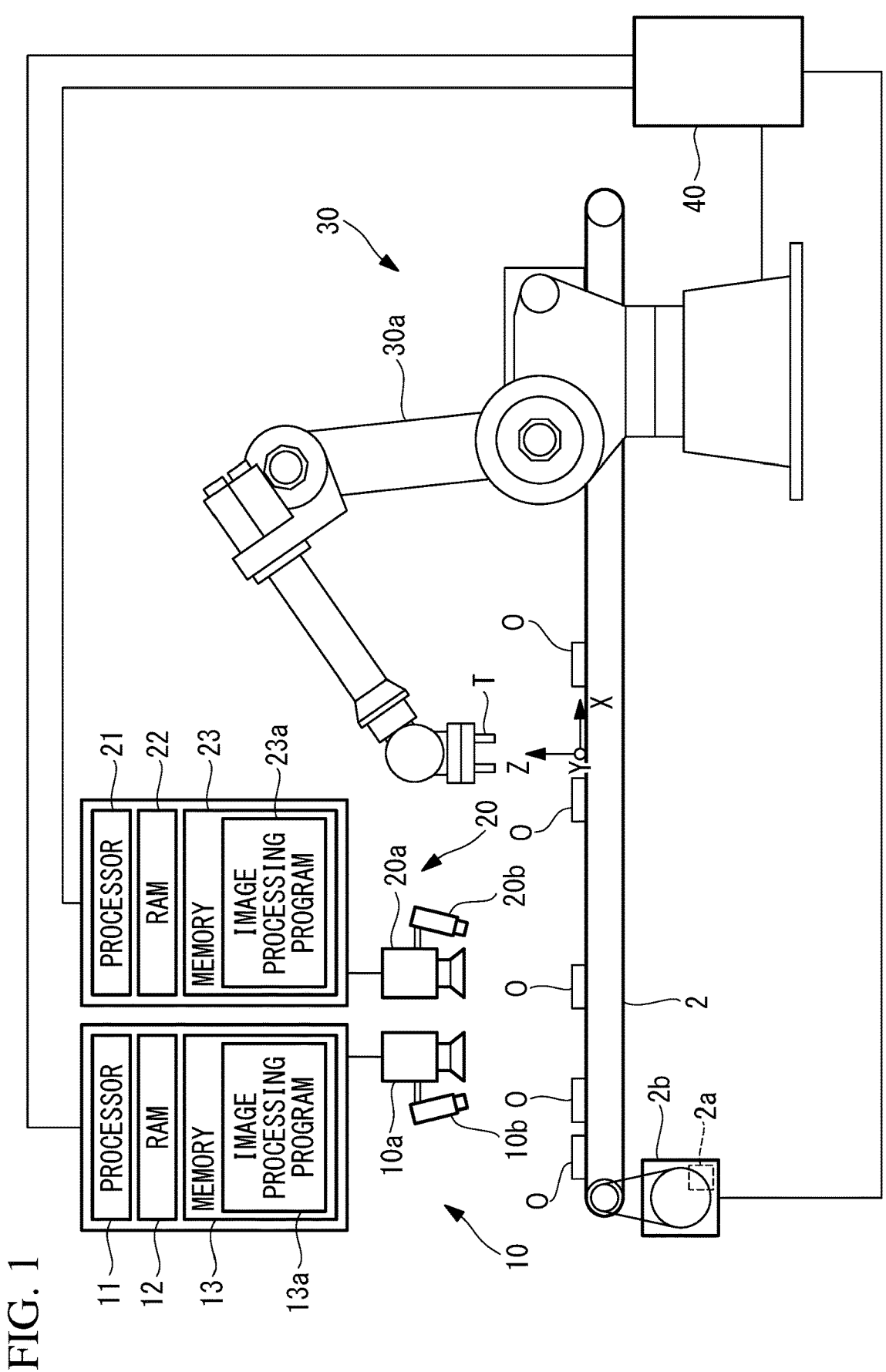
FIG. 1 is a view showing a configuration of a robot system in which a detection system according to a first embodiment of the present invention is used.

The detection system of the first embodiment is used in, for example, a robot system shown in FIG. 1 and is provided with: a first detection apparatus (detection unit) 10; a second detection apparatus (detection unit) 20; and a control unit 40 that controls a robot 30. The robot (work machine) 30 performs predetermined work on objects O that are articles moved by a conveyor device (moving means) 2. A tool T is mounted at a distal end section of the robot 30, and the robot 30, for example, picks the objects O on the conveyor device 2 by means of the tool T. In this embodiment, the conveying direction of the conveyor device 2 matches with the X-axis direction of a reference coordinate system 201 shown in FIG. 1, the vertical direction matches with the Z-axis direction of the reference coordinate system 201, shown in FIG. 1, and the Y-axis direction of the reference coordinate system 201, shown in FIG. 1, is set to match with the width direction of the conveyor device 2. The control unit 40 may be formed of a single control device or may be formed of a plurality of control devices.

Although the robot 30 is not limited to a specific type of robot, the robot 30 in this embodiment is a vertical articulated robot that is provided with a plurality of servomotors 31 (see FIG. 2) for respectively driving a plurality of movable parts. Note that the plurality of movable parts constitute an arm 30a of the robot 30. Each of the servomotors 31 has an operating-position detection device for detecting an operating position thereof, and the operating-position detection device is, for example, an encoder. A detection value from the operating-position detection device is sent to the control unit 40. The robot 30 may also be a horizontal articulated robot, a multilink robot, or the like.

Figure 2:
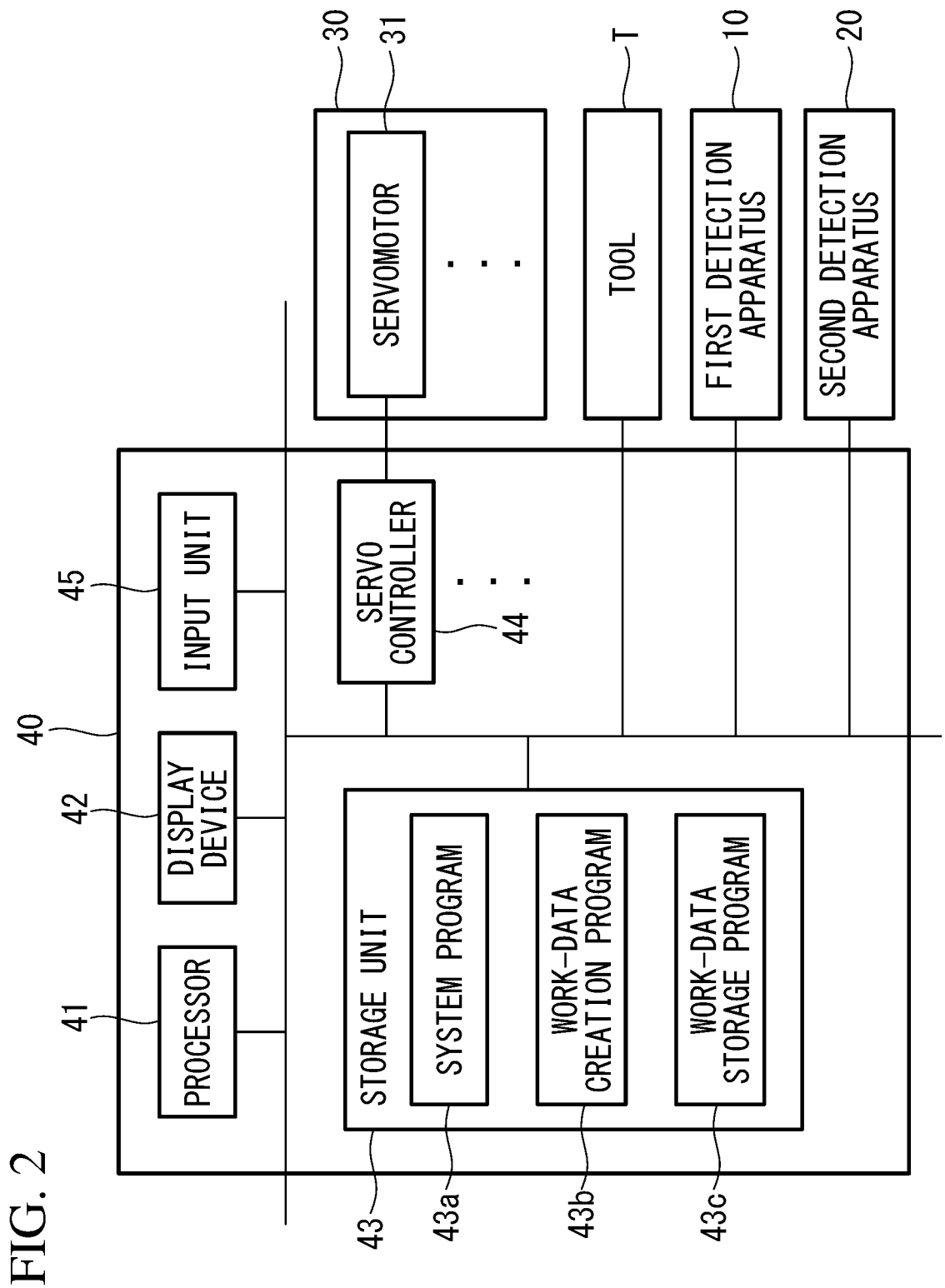
FIG. 2 is a block diagram of a control unit of the detection system according to the first embodiment.

As shown in FIG. 2, for example, the control unit 40 is provided with: a processor 41, such as a CPU; a display device 42; a storage unit 43 that has a nonvolatile storage, a ROM, a RAM, etc.; a plurality of servo controllers 44 that handle the servomotors 31 of the robot 30, respectively; and an input unit 45, such as an operator's panel.

The storage unit 43 has a system program 43a stored therein, and the system program 43a is in charge of the basic function of the control unit 40. Furthermore, the storage unit 43 has a work-data creation program (work-data creation means) 43b and a work-data storage program (work-data storage unit) 43c stored therein. Furthermore, the storage unit 43 also has an operation program and a tracking control program stored therein, and the processor 41 controls the respective servomotors 31 of the robot 30 and the tool T on the basis of the respective programs, thereby picking the objects O that are being conveyed by the conveyor device 2.

Note that the first detection apparatus 10 and the second detection apparatus 20 perform the following detection at a working position of the robot 30 or at a position closer to the upstream side of the conveying direction than the working position of the robot 30 is.

The first detection apparatus 10 has an image acquisition device 10a, and the image acquisition device 10a is a 2D camera, a 3D camera, or the like. Instead of the image acquisition device 10a, it is also possible to use a 3D distance sensor or the like, or to use another sensor that can obtain data for detecting the position and the orientation of an object O. The image acquisition device 10a in this embodiment is a 2D camera, and the image acquisition device 10a is supported above the conveyor device 2 by means of a frame etc. (not shown). The first detection apparatus 10 has an illumination device 10b that radiates, for example, visible light for illuminating an image acquisition position thereof, and the illumination device 10b radiates light only when image acquisition is performed by the image acquisition device 10a.

The first detection apparatus 10 is provided with a processor 11, a RAM 12, and a memory 13 that has an image processing program 13a stored therein. On the basis of the image processing program 13a, the processor 11 performs, for example, blob processing, pattern matching processing, orientation detection processing that is based on the position of a feature point, or other processing. Detection data (first data element) obtained in the first detection apparatus 10 is sent to the control unit 40. The detection data includes at least position data on each object O and may further include orientation data on each object O.

The first detection apparatus 10 performs, on the basis of the image processing program 13a, work-related-data acquisition processing of obtaining the matching degree between the shape of a predetermined part, which is measured through pattern matching processing or the like, and a predetermined model shape (work-related score). If the predetermined part is a part to be held by the tool T, the difficulty level of holding performed by the tool T differs depending on the shape of the part. Thus, the score obtained for each object O through the work-related-data acquisition processing indicates a difficulty level of the work with respect to the object O. The work-related data (second data element), which includes the work-related score (index) and which is obtained in the first detection apparatus 10, is sent to the control unit 40.

The second detection apparatus 20 has an image acquisition device 20a, and the image acquisition device 20a detects at least one of the quality (quality), the kind, and an inspection result (quality) of an object O. In this embodiment, the image acquisition device 20a is a 2D camera and has an illumination device 20b that radiates ultraviolet light onto an image acquisition position thereof. The illumination device 20b radiates ultraviolet light only when image acquisition is performed by the image acquisition device 20a. The image acquisition device 20a is capable of acquiring an image of fluorescence of a predetermined wavelength generated from an object O irradiated with ultraviolet light by the illumination device 20b. Note that the illumination device 20b may radiate infrared light or visible light.

The second detection apparatus 20 is provided with a processor 21, a RAM 22, and a memory 23 that has an image processing program 23a stored therein. On the basis of the image processing program 23a, the processor 21 performs: detection of an object O; and quality-related-data acquisition processing of obtaining the area of a section, in the object O, where fluorescence of the predetermined wavelength is generated (quality-related score), by using image processing, e.g., pattern matching processing, binarization processing, etc. In a case where objects O are perishable food, the wavelength, intensity, etc. of fluorescence change depending on the freshness, the presence or absence of rot, etc. Thus, the area obtained for each object O through the quality-related-data acquisition processing indicates the quality of the object O. The quality-related data (second data element), which includes the quality-related score (index) and which is obtained in the second detection apparatus 20, is sent to the control unit 40. Because the wavelength, intensity, etc. of fluorescence change according to the material, the processor 21 can also obtain the kind of an object O through the quality-related-data acquisition processing on the basis of the wavelength of fluorescence from the object O.

The conveyor device 2 has an encoder 2a that can detect the amount of movement of each object O. The encoder 2a is provided, for example, in a motor 2b that drives the conveyor device 2.

For example, every time a predetermined amount of movement is detected by the encoder 2a, the first detection apparatus 10 performs, on the object O, the position detection processing, the orientation detection processing, and the work-related-data acquisition processing, and the second detection apparatus 20 performs the quality-related-data acquisition processing immediately before, immediately after, or simultaneously with the position detection processing and the orientation detection processing, which are performed by the first detection apparatus 10. Alternatively, if the results from the first detection apparatus 10 can be associated with the result from the second detection apparatus 20, the second detection apparatus 20 can perform detection at any timing.

Note that the amount of movement may also be detected by using the first detection apparatus, without using the encoder.

The control unit 40 receives the detection data and the work-related data on each object O from the first detection apparatus 10, and receives the quality-related data on each object O from the second detection apparatus 20 in such a manner as to be associated with the detection data and the work-related data on the corresponding object O. For example, each item of the quality-related data includes approximate position data on the corresponding object O. Thus, the control unit 40 can associate the detection data and the work-related data with the quality-related data.

On the basis of the work-data creation program 43b, the processor 41 of the control unit 40 creates, for each object O, work data that has: detection data (the first data element); and corresponding work-related data (the second data element) and corresponding quality-related data (the second data element). Furthermore, the processor 41 stores the created work data in the storage unit 43 on the basis of the work-data storage program 43c. For example, the work data is stored in a work queue, and a plurality of work-data items are arrayed in the work queue on the basis of the position data. More specifically, a plurality of work-data items are arrayed in the work queue in order from the downstream side in the conveying direction of the conveyor device 2.

The control unit 40 receives the detection data and the work-related data from the first detection apparatus 10 and the work-related data and the quality-related data from the second detection apparatus 20, and the processor 41 creates work data that has: the received detection data; and the corresponding work-related data and the corresponding quality-related data.

The processor 41 determines whether work data for the same object O for which the new work data is created already exists in the work queue. Whether both the work data items are created for the same object O is determined by a known method by using the position data in both the work data items, the amounts of movement of the objects O, which are obtained from the encoder 2a, etc. For example, if it is determined that the distance between the objects O is less than a certain threshold, it is determined that the objects O are the same object. Then, if work data for the same object O already exists, the processor 41 selects, as the work data that should be stored, one of the work data that is newly created and the work data that has already been stored, and stores the selected work data in the work queue, on the basis of the work-data storage program 43c.

FIG. 3 shows a case in which the same object O is detected three times within a predetermined detection region in an angle of view of the first detection apparatus 10. First detection is performed at one end of the detection region in the conveying direction (the X-axis direction), second detection is performed at the center of the detection region in the conveying direction, and third detection is performed at the other end of the detection region in the conveying direction. In this case, due to the influence of distortion of a lens of the first detection apparatus 10 or other reasons, the work-related score tends to be better at the center of the detection region than those at one end thereof and the other end thereof, and the area of a section where fluorescence is generated, which serves as the quality-related score, tends to be larger at the center of the detection region than those at one end thereof and the other end thereof. On the other hand, the other end of the detection region is closer to the work area used by the robot 30 than the center thereof is. If there is a possibility where the object O moves on the conveyor device 2, it is preferable to use detection data that is obtained at the third detection, which improves the accuracy of work performed by the robot 30.

Criterias for the above-mentioned selection change in accordance with various situations. Example criterias for the above-mentioned selection will be shown below.
(Selection Based on the Work-Related Score)

If work data for the same object O for which the new work data is created already exists in the work queue, the processor 41 compares the matching degrees (the work-related scores) in both the work data items and keeps (stores), in the work queue, the work data that has the higher one of the matching degrees. A higher matching degree means that it is easier for the tool T to hold the object O and that the control unit 40 grasps the shape and the position of the object O more accurately. Note that it is also possible to keep, in the work queue, the work data that has the lower one of the matching degrees, according to the purpose. For example, this may be a case in which priority is given to the score of quality data, or other cases.

On the other hand, if the matching degrees in both the work data items are the same, the work data that has already been stored in the work queue is kept (stored) in the work queue. At this time, it is also possible to keep (store) the newly created work data, in the work queue. If the position of an article (object O) can be changed, it is more advantageous to keep the newly created work data in the work queue, in some cases.
(Selection Based on the Quality-Related Score)

If work data for the same object O for which the new work data is created already exists in the work queue, the processor 41 compares the areas of the sections where fluorescence is generated (the quality-related scores) in both the work data items and keeps (stores), in the work queue, the work data that has the larger one of the areas. Being larger in the area indicates that, for example, the quality of the object O has deteriorated. In this case, an article whose quality is lower is preferentially picked by the robot 30. The same article (object O) is checked several times while changing illumination, and, if there is even one article whose quality has deteriorated, the article that has such quality data is kept in the work queue, which achieves improvement of the quality of inspection. Note that it is also possible to keep, in the work queue, the work data that has the smaller one of the areas (better quality), according to the purpose. In this case, priority is given to an article that has the best quality.

On the other hand, if the above-described areas in both the work data items are the same, the work data that has already been stored in the work queue is kept (stored) in the work queue. At this time, it is also possible to keep (store), in the work queue, the newly created work data.
(Selection Based on the Work-Related Score and the Quality-Related Score)

If work data for the same object O for which the new work data is created already exists in the work queue, the processor 41 compares the areas of sections where fluorescence is generated (the quality-related scores) in both the work data items and keeps (stores), in the work queue, the work data that has the larger one of the areas. Note that it is also possible to keep, in the work queue, the work data that has the smaller one of the areas, according to the purpose.

At this time, if the above-described areas in both the work data items are the same, the matching degrees (the work-related scores) in both the work data items are compared, and the work data that has the higher one of the matching degrees is kept (stored) in the work queue. It is also possible to keep, in the work queue, the work data that has the lower one of the matching degrees, according to the purpose.

On the other hand, if the above-described areas and the matching degrees in both the work data items are the same, the work data that has already been stored in the work queue is kept (stored) in the work queue. At this time, it is also possible to keep (store) the newly created work data, in the work queue.

Note that it is also possible to perform the same processing as described above by using a plurality of kinds of the work-related score and a plurality of kinds of the quality-related score.

A robot system according to a second embodiment of the present invention will be described below.

In a detection system of the second embodiment, instead of selecting one of the already-stored work data and the new work data as in the first embodiment, one of the data element in the already-stored work data and the data element in the new work data is selected, and the selected data element is stored in the work queue. ここから

For example, if there is a possibility of the object O moving on the conveyor device 2, it is preferable to use the detection data (position data), which is the first data element on the object O, obtained at the third detection in FIG. 3. In addition, in order to reliably pick up an object O with reduced quality by means of the robot 30, it is desirable to obtain the area of a section in the object O where fluorescence is generated (the quality-related score), as accurately as possible; however, due to the distortion of a lens of the second detection apparatus 20 or the like, the area of a section where fluorescence is generated tends to be accurate at the second detection.

In order to further improve the work of the robot 30 in such a situation, if work data for the same object O as the newly created work data already exists in the work queue, for example, the processor 41 replaces the detection data (the position data), which is the first data element, in the work data that already exists in the work queue, with the detection data in the newly created work data. Accordingly, if there is a possibility of the object O moving on the conveyor device 2, the robot 30 picks the object O by using the latest position data.

If work data for the same object O as the newly created work data already exists in the work queue, the processor 41 concurrently compares the above-described areas (the quality-related scores) included in the quality-related data (the second data elements) and keeps (stores), in the work queue, the quality-related data that has the larger one of the areas. Specifically, if the area included in the quality-related data of the newly created work data is larger, the quality-related data of the work data that already exists in the work queue is replaced with the quality-related data of the newly created work data.

Note that, in the second embodiment, when an image of the same object O is acquired twice by the first detection apparatus 10 or the second detection apparatus 20, it is also possible to change illumination for the first image acquisition and for the second image acquisition. For example, it is possible to use, for the first image acquisition, illumination suitable for position detection and to use, for the second image acquisition, illumination suitable for accurately obtaining the work-related score, the quality-related score, etc.

Note that the same selection criteria as in the first embodiment can also be used to perform selection and replacement of a data element in work data, in the second embodiment.

Note that, in the above-described respective embodiments, it is also possible to obtain the work-related score of each object O on the basis of the position of the object O in the Y-axis direction. For example, in the Y-axis direction, it is difficult to perform work at a position far from the robot 30, and it is easy to perform work at a position near the robot 30, in many cases. Thus, when the work-related score is determined according to the position data of each object O in the Y-axis direction, it is possible to improve the accuracy and reliability of work.

Furthermore, in the above-described respective embodiments, it is also possible to obtain the work-related score on the basis of the orientation of each object O. There is an orientation of an object O in which it is difficult for the robot 30 to perform work, due to the shape of the object O, the shape of the tool T on the robot 30, etc. In such a case, when the work data or the data element therein is replaced on the basis of the work-related score that is based on the orientation of the object O, the accuracy and reliability of work performed by the robot 30 are improved.

Furthermore, in the above-described respective embodiments, the first detection apparatus 10 may obtain the matching degree (the quality-related score) between the shape of a detected object O and the predetermined model shape. For example, when an object O is perishable food, the shape of the object O changes depending on its freshness, the presence or absence of rot, etc. Furthermore, the first detection apparatus 10 may also perform quality inspection for a flaw, tear, etc. In this case, the quality-related score can be obtained without providing the second detection apparatus 20.

Furthermore, in the above-described respective embodiments, it is also possible to detect the amount of movement of the object O by using, instead of the encoder 2a, a camera, a 3D measurement instrument, a 3D distance sensor, or the like. By detecting a mark, an object O, etc. on the conveyor device 2 by means of the camera, for example, the amount of movement of the object O can be detected. The amount of movement can also be detected by using other means.

Furthermore, in the above-described respective embodiments, instead of the conveyor device 2, another robot, e.g., an automated guided vehicle (AGV), may move the object O. In this case, the same advantageous effect as described above can be achieved. Furthermore, in a case in which the object O is a vehicle, a frame of a vehicle, etc., the object O, on which predetermined work is performed, may move by means of its engine, wheels, etc. In such cases, the other robot, the engine, the wheels, etc. function as moving means.

Furthermore, in a case in which a frame of a vehicle or the like is moved by a moving means, a hole provided in the frame, a welding point on the frame, etc. can be the object O. In this case, the first detection apparatus 10 sends, to the control unit 40, the position data on the object O, the matching degree between the shape of the object O and the model shape (the work-related score), the quality-related score, which indicates the roundness of the hole, the color of the welding point, the presence or absence of a scratch around the hole, or the like.

It is also possible to move the object O by means of a chute on which the object O slips down, rolls down, or falls down due to gravity, instead of the conveyor device 2. In this case, it is also possible to vibrate the chute, which is inclined, by using an excitation device, thus smoothly moving the object O on the chute. In such cases, the chute, the excitation device, etc. function as moving means, and the object O moved on the chute is picked by the tool T mounted on the robot 30.

Note that, in the above-described respective embodiments, if another robot is provided on the downstream side, the robot 30 is not necessarily required to pick up all objects O on the conveyor device 2. In this case, the first data element in each work data item may also be provided in each robot.

Furthermore, in the above-described respective embodiments, the function based on the image processing program 13a in the first detection apparatus 10 and the function based on the image processing program 23a in the second detection apparatus 20 may be realized by the control unit 40 or another computer.

In the first embodiment, on the basis of the index related to an object O and included in the second data element, one of work data that is newly created for the object O and work data for the object that has been stored by the work-data storage unit is selected as the work data that should be stored. Because the work data is replaced by using the emphasized index, from among the detection accuracy of the shape of the object O, the quality of the object O, the kind of the object O, etc., it is possible to efficiently and effectively utilize the detection data from the first detection apparatus 10 and the second detection apparatus 20.

Furthermore, in the second embodiment, on the basis of the indices related to the object O and included in the second data element, one of the data element in the work data that is newly created for the object O and the data element in the work data for the object that has been stored by the work-data storage unit is selected as the data element that should be stored. Furthermore, the data element is one of the first data element and the second data element. Because the data element in the work data is replaced by using the emphasized index, from among the detection accuracy of the shape of the object O, the quality of the object O, the kind of the object O, etc., it is possible to efficiently and effectively utilize the detection data from the detection unit.

Furthermore, in the above-described respective embodiments, the processor 41 of the control unit 40 creates work data that has, as an index of the second data element, the work-related score related to the difficulty level of the work with respect to the object O.

In order to appropriately perform work by means of a work machine, such as the robot 30, it is generally preferred that the difficulty level of the work with respect to the object O be lower. Using, as an index, the work-related score related to the difficulty level of the work with respect to the object O is advantageous for more appropriately performing the work with respect to the object O.

Furthermore, in the above-described respective embodiments, the processor 41 of the control unit 40 creates work data that further has, as an index of the second data element, another score that is different from the work-related score.

It is preferred that the work data or the data element therein be flexibly replaced according to the purpose of work performed by a work machine, such as the robot 30. In this configuration, work data has, as an index, another score that is different from the work-related score. Thus, the work data or the data element therein can be replaced by preferentially using a score suitable for the purpose of the work.

Furthermore, in the above-described respective embodiments, the processor 41 of the control unit 40 creates work data that has, as an index of the second data element, the quality-related score, which is related to at least one of the quality and the kind of an object O.

It is preferred that the work data or the data element therein be flexibly replaced according to the purpose of work performed by a work machine, such as the robot 30. In this configuration, work data has the quality-related score, which is a score different from the work-related score and which is related to at least one of the quality and the kind of an object. Thus, it is possible to replace the work data or the data element therein by preferentially using a score suitable for the purpose of work.

Furthermore, in the above-described respective embodiments, the processor 41 of the control unit 40 selects work data that should be stored, preferentially on the basis of one of: the work-related score; and another score or the quality-related score.

By changing the score that is preferentially considered, the operation of a work machine, such as the robot 30, can be easily and efficiently adapted for the purpose of work.

Furthermore, in the above-described respective embodiments, if the index in work data that is newly created is the same as the index in work data that has been stored by the work-data storage unit, the processor 41 of the control unit 40 selects, as the work data that should be stored, the work data that is newly created.

In this case, even when the work data that is newly created is stored, the index of the object does not change, but the position data of the first data element in the work data becomes the latest. For example, if there is a possibility of the object O moving on the conveyor device 2, this configuration in which the latest position data can be used is advantageous in improving the accuracy and reliability of work.

Furthermore, in the above-described respective embodiments, the work-related score may be related to at least one of: the contrast of the object O in an image acquired by the image acquisition device 10a of the first detection apparatus 10; the distortion of the object O in the image; and the position of the object O in a direction (the Y-axis direction) perpendicular to the direction of movement of the conveyor device 2.

When the work with respect to the object O is performed by a work machine, such as the robot 30, if the contrast of the object O in an image acquired by the image acquisition device 10a is low or if the distortion of the object O is large therein, the work performed by the work machine is undesirably affected in some cases. Furthermore, the work performed by the work machine becomes easy when the distance from the work machine to the object O in the Y-axis direction is appropriate. Thus, this configuration is advantageous in improving the accuracy and reliability of the work.

From the above-described embodiments, the following aspects of the present disclosure are derived.

According to a first aspect, the present invention provides a detection system including: a detection unit that detects an object, which is being moved by a moving means, within a detection region a plurality of times; a work-data creation unit that creates, every time the detection unit performs detection of the object, work data having a first data element that indicates at least a position of the object obtained by the detection unit and a second data element that includes at least an index which is related to the object and which is obtained at the time of the detection; and a work-data storage unit that stores the work data created by the work-data creation unit, wherein the work-data storage unit selects, as work data that should be stored, one of the work data that is newly created for the object and the work data for the object that has been stored by the work-data storage unit, on the basis of the index.

According to a second aspect, the present invention provides a detection system including: a detection unit that detects an object, which is being moved by a moving means, within a detection region a plurality of times; a work-data creation unit that creates, every time the detection unit performs detection of the object, work data having a first data element that indicates at least a position of the object obtained by the detection unit and a second data element that includes at least an index which is related to the object and which is obtained at the time of the detection; and a work-data storage unit that stores the work data created by the work-data creation unit, wherein the work-data storage unit selects, as a data element to be stored, one of a data element in the work data that is newly created for the object and the data element in the work data for the object that has been stored by the work-data storage unit, on the basis of the index, and the data element is one of the first data element and the second data element.

For example, if there is a possibility of the object moving on the moving means, it is preferred that work be performed by a robot, etc. by using the latest position of the object. Furthermore, when the shape of the object is recognized as accurately as possible in order to appropriately perform the work by means of the robot, etc., it is desirable to reflect, from among a plurality of times of detection of the object, detection in which the most accurate shape of the object is recognized. Furthermore, when the quality, the kind, or the like of the object is emphasized, it is preferable to reflect, from among a plurality of times of detection of the object, detection in which the quality, the kind, or the like of the object is most accurately recognized. Here, the detection accuracy of the shape of the object, the quality of the object, and the kind of the object are examples of an index related to the object and included in the second data element.

In the first aspect, on the basis of the index which is related to the object and which is included in the second data element, one of the work data that is newly created for the object and the work data for the object that has been stored by the work-data storage unit is selected as the work data that should be stored. Because the work data is replaced by using the emphasized index, from among the detection accuracy of the shape of the object, the quality of the object, the kind of the object, etc., it is possible to efficiently and effectively utilize detection data from the detection unit.

In the second aspect, on the basis of the index which is related to the object and which is included in the second data element, one of the data element in the work data that is newly created for the object and the data element in the work data for the object that has been stored by the work-data storage unit is selected as the data element that should be stored. Furthermore, the data element is one of the first data element and the second data element. Because the data element in the work data is replaced by using the emphasized index, from among the detection accuracy of the shape of the object, the quality of the object, the kind of the object, etc., it is possible to efficiently and effectively utilize detection data from the detection unit.

In the above-described aspect, it is preferred that the work-data creation unit create the work data that has, as the index of the second data element, a work-related score which is related to the difficulty level of work with respect to the object.

In order to appropriately perform work by means of a work machine, such as a robot, it is generally preferred that the difficulty level of the work with respect to the object be lower. Using, as an index, the work-related score which is related to the difficulty level of the work with respect to the object is advantageous for more appropriately performing the work with respect to the object.

In the above-described aspect, it is preferred that the work-data creation unit create the work data that further has, as the index of the second data element, another score that is different from the work-related score as the index of the second data element.

It is preferred that the work data or the data element therein be flexibly replaced according to the purpose of work performed by a work machine, such as a robot. In this aspect, the work data has, as an index, another score that is different from the work-related score. Thus, the work data or the data element therein can be replaced by preferentially using a score suitable for the purpose of work.

In the above-described aspect, it is preferred that the work-data creation unit create the work data that has, as the index of the second data element, a quality-related score related to at least one of the quality and kind of the object.

It is preferred that the work data or the data element therein be flexibly replaced according to the purpose of work performed by a work machine, such as a robot. In this aspect, the work data has the quality-related score, which is a score different from the work-related score and which is related to at least one of the quality and the kind of the object. Thus, it is possible to replace the work data or the data element therein by preferentially using a score suitable for the purpose of work.

In the above-described aspect, it is preferred that the work-data storage unit select the work data that should be stored, on the basis of a higher-priority one of: the work-related score; and the other score or the quality-related score.

By changing the score to be preferentially considered, the operation of a work machine, such as a robot, can be easily and efficiently adapted for the purpose of work.

In the above-described aspect, it is preferred that, when the index in the work data that is newly created and the index in the work data that has been stored by the work-data storage unit are the same, the work-data storage unit select, as the work data that should be stored, the work data that is newly created.

In this case, even when the work data that is newly created is stored, the index of the object does not change, but the position data of the first data element in the work data becomes the latest. For example, if there is a possibility of the object moving on the moving means, this configuration in which the latest position data can be used is advantageous in improving the accuracy and reliability of the work.

In the above-described aspect, it is preferred that the work-related score be related to at least one of the contrast of the object in an image acquired by an image acquisition device of the detection unit, a distortion of the object in the image, and the position of the object in a direction perpendicular to the direction of movement of the moving means.

When the work with respect to the object is performed by a work machine, such as a robot, if the contrast of the object in an image acquired by the image acquisition device is low or if the distortion of the object therein is large, the work performed by the work machine is undesirably affected in some cases. Furthermore, the work performed by the work machine becomes easy when the distance from the work machine to the object in the above perpendicular direction is appropriate. Thus, this configuration is advantageous in improving the accuracy and reliability of work.

According to the aforementioned aspects, it is possible to efficiently and effectively utilize detection data from a detection unit that detects an object that is being moved by a moving means.

The invention claimed is:

1. A detection system comprising:
a detector that detects an object, which is being moved, within a detection region a plurality of times; and
a controller which:
creates, every time the detector performs detection of the object, work data having a first data element that indicates at least a position of the object obtained by the detector and a second data element that includes at least an index which is related to the object and which is obtained at the time of the detection, and
stores the work data thus created,
wherein the controller selects, as work data to be stored, one of the work data that is newly created for the object and the work data for the object that has already been stored, on the basis of the index,
wherein the index of the second data element comprises a work-related score related to a difficulty level of work with respect to the object,
wherein the index of the second data element further comprises a quality-related score related to at least one of the quality and kind of the object, and
wherein the controller selects the work data to be stored based on a higher-priority of one of the work-related score and the quality-related score.

2. The detection system according to claim 1, wherein the index of the second data element comprises another score that is different from the work-related score.

3. The detection system according to claim 1, wherein, when the index in the work data that is newly created and the index in the work data that has already been stored are the same, the controller selects, as the work data to be stored, the work data that is newly created.

4. The detection system according to claim 1, wherein the work-related score is related to at least one of contrast of the object in an image acquired by a camera of the detector, a distortion of the object in the image, and a position of the object in a direction perpendicular to a moving direction of a conveyor.

5. A detection system comprising:
a detector that detects an object, which is being moved, within a detection region a plurality of times; and
a controller which:

creates, every time the detector performs detection of the object, work data having a first data element that indicates at least a position of the object obtained by the detector and a second data element that includes at least an index which is related to the object and which is obtained at the time of the detection, and stores the work data thus created, wherein the controller selects, as a data element to be stored, one of a data element in the work data that is newly created for the object and the data element in the work data for the object that has already been stored, on the basis of the index, wherein the data element is one of the first data element and the second data element, wherein the index of the second data element comprises a work-related score related to a difficulty level of work with respect to the object, wherein the index of the second data element further comprises a quality-related score related to at least one of the quality and kind of the object, and wherein the controller selects the work data to be stored based on a higher-priority of one of the work-related score and the quality-related score.

6. A detection system comprising:

a detector that detects a same object, which is being moved, within a detection region a plurality of times; and a controller which:

creates, every time the detector performs detection of the same object, work data having a first data element that indicates at least a position of the same object obtained by the detector and a second data element that includes at least an index which is related to the same object and which is obtained at the time of the detection and, stores the work data thus created;

wherein the second data element includes a quality-related score indicating at least one of freshness of the same object and presence or absence of rot of the same object, wherein the controller selects, as work data to be stored, newly created work data for the same object when the quality-related score of the newly created work data of the same object is higher than the quality-related score of work data for the same object that has been stored.

* * * * *